United States Patent [19]
Rautanen et al.

[11] Patent Number: 6,061,014
[45] Date of Patent: May 9, 2000

[54] SURVEILLANCE METHOD FOR WIDE AREAS

[76] Inventors: Jouko Rautanen, Alhonkuja 3, FIN-55100 Imatra, Finland; Jari Korja, Kuusihaankatu 3 B 25, FIN-45100 Kouvola, Finland

[21] Appl. No.: 09/101,211
[22] PCT Filed: Jan. 10, 1997
[86] PCT No.: PCT/FI97/00010
§ 371 Date: Jul. 2, 1998
§ 102(e) Date: Jul. 2, 1998
[87] PCT Pub. No.: WO97/25628
PCT Pub. Date: Jul. 17, 1997

[30] Foreign Application Priority Data

Jan. 12, 1996 [FI] Finland ..................... 960162

[51] Int. Cl.[7] ............. G01S 13/86; G01S 13/56
[52] U.S. Cl. ................ 342/52; 342/53; 342/55; 342/28
[58] Field of Search ............... 342/27, 28, 52, 342/53, 54, 55

[56] References Cited

U.S. PATENT DOCUMENTS

| | | | |
|---|---|---|---|
| 3,010,102 | 11/1961 | Ketchledge et al. | 342/53 |
| 4,312,002 | 1/1982 | Stewart | 343/725 |
| 4,791,427 | 12/1988 | Raber et al. | 343/754 |
| 5,134,409 | 7/1992 | De Groot | 342/52 |
| 5,307,077 | 4/1994 | Branigan et al. | 343/720 |
| 5,877,688 | 3/1999 | Morinaka et al. | 340/584 |

FOREIGN PATENT DOCUMENTS

| | | |
|---|---|---|
| 205 794 | 12/1986 | European Pat. Off. . |
| 310 869 | 4/1989 | European Pat. Off. . |
| 26 56 318 | 6/1978 | Germany . |
| 31 42 022 | 5/1983 | Germany . |

OTHER PUBLICATIONS

System Overview and Applications of a Panoramic Imaging Perimeter Sensor, Danidl A. Pritchard, Sandia National Laboratories, Int'l. Carnahan Conference on Security Technology, Oct. 18–20, 1995, Sanderstead, Surrey, England.

Aksu, I. et al, "A comparison of the performance of image motion analysis algorithms operating on low signal to noise ratio images", IEEE Circuits and Sys. 1991, Proc., 1992, pp. 158–161, vol. 1, 1992.

Sworder, D. D. et al, "The usefulness of imaging sensors in motion prediction", Sigs., Sys., & Computers, pp. 721–725, vol. 2, 1992.

Lee, J. et al, "A novel approach to real–time motion detection", Procs. CVPR '88, pp. 730–735, 1988.

Houles, A. et al, "Multisensor tracking of a maneuvering target in clutter", IEEE Trans. A & E systems, vol. 25 2, pp. 176–189, Mar. 1989.

Nichols, S. et al, "Reliable motion detection of small targets in video with low signal–to–clutter ratios", IEEE 29th Annual Int'l Conf. on Security Tech., pp. 447–456, 1995.

Nelson, C. et al, "Sensor fusion for intelligent alarm analysis", IEEE AES Systems Magazine, pp. 18–23, Sep. 1997.

*Primary Examiner*—John B. Sotomayor
*Attorney, Agent, or Firm*—Andrus, Sceales, Starke & Sawall

[57] ABSTRACT

A method for monitoring large surface areas. A thermal camera and an electromagnetic radar are rotated about a vertical axis to scan the area. The area is divided into sector-like surface elements. Monitoring criteria are established for each of the surface elements. Movements in the surface area being monitored are detected by the radar. The thermal camera is used to detect objects different, in temperature, from their surroundings. Detected objects are located in a surface element and identified in accordance with the monitoring criteria using at least one of the radar and thermal camera.

14 Claims, 1 Drawing Sheet

SURVEILLANCE METHOD FOR WIDE AREAS

BACKGROUND OF THE INVENTION—SUMMARY OF THE INVENTION

The present invention relates to a procedure for monitoring large surface areas, which has been developed especially for the monitoring of outdoor areas to detect the presence of people, but which can just as well be used in large indoor spaces and for other types of area supervision.

The procedure of the invention can be applied to the supervision of various storage areas, supervision of working sites, frontier supervision, passage control in industrial areas, supervision of military areas, airports, etc.

In the various applications mentioned above and in corresponding applications where supervision is needed, the monitoring equipment mainly consists of video cameras and various optical, mechanical or electrical switches, sensors or alarm systems designed to detect movements or other effects produced by an object moving in the area watched over.

However, prior-art solutions have significant drawbacks. Weather and illumination conditions render the video camera inapplicable for effective monitoring of outdoor areas. The various switches, sensors and alarm devices used serve relatively local needs and are therefore required in large quantities when a large area is to be monitored. Thus, building and especially maintaining a monitoring system is expensive. Moreover, different individual alarm switches are often relatively easy to evade or to make inoperative.

The object of the present invention is to eliminate the above-mentioned drawbacks. A specific object of the invention is to produce a new procedure which allows a maximal land and/or water area to be monitored and supervised in a simple and centralized manner from a single observation point.

As for the features characteristic of the invention, reference is made to the claims.

In the procedure of the invention for the monitoring of large surface areas, the area to be supevised is monitored substantially by means of a monitoring unit located at one point and comprising both a thermal camera and an electromagnetic radar, which are rotated about a vertical axis to scan the area in a horizontal plane. Moreover, the monitoring unit comprises a suitable processing device for the processing of the data supplied by the thermal camera and radar and for performing the functions required by the data obtained, such as issuing an alarm. According to the invention, the area to be monitored is divided into surface elements as a function of the angle of rotation of the vertical shaft and the scanning distance, and monitoring criteria are defined for each surface element. These actions are performed in the memory and files of the processing device. The monitoring criteria may be the same for the entire area to be monitored, in which case they need not be defined separately for different surface elements. The criteria may also be different for each surface element or for larger groups of surface elements. In the procedure of the invention, movements in the surface area to be monitored are observed by means of an electromagnetic radar and, by means of a thermal camera, objects differing from their surroundings in respect of temperature are searched and discriminated. In addition, depending on the circumstances and the distance of observation, either the radar or the thermal camera is used to define the location of the object, i.e. the surface element within which the object has been detected, and to identify the object detected.

The thermal camera and the radar are preferably rotated about a vertical shaft simultaneously, or the thermal camera and the radar are connected together so that they will scan the same sector of the area at the same time. Thus, the information obtained from each can be immediately compared with that obtained from the other device and, if necessary, an alarm can be issued immediately.

It is also possible to turn the thermal camera and the radar about the vertical shaft independently of each other, in which case both can be used continuously or the scanning is performed by only one of the devices and only if the information obtained contains something suspicious, the area in question is checked by the other device as well.

In the procedure of the invention, the entire area to be monitored, which may be a circle or a large sector of a circle, such as a semicircle, is preferably divided into sectors opening from the monitoring unit in all directions over the surface area to be monitored, and these sectors are additionally divided into surface elements in the direction of the scanning distance.

In the procedure of the invention, in addition to horizontal rotational scanning, the radar preferably scans in the direction of distance with the selected surface element resolution. In this case, the echo from each surface element is subjected to an FFT transformation, thus distinguishing moving objects from stationary ones and determinining the velocity and distance of a moving object.

Different parts of the area to be monitored may have different supervision criteria, e.g. such that for some parts an alarm is issued upon any movement, in other parts movement is always allowed and in yet other parts movement is only allowed at certain times. In this way, surface elements having the same supervision criteria can be combined into a surface element group which is treated as a coherent whole in regard of alarms.

In the procedure of the invention, an object in the area to be monitored can be detected on the basis of its movement by means of the radar and on the basis of a temperature deviating from the surroundings by means of the thermal camera. After the object has been detected in one of these ways, the sector in which the object is located, i.e. the sector just observed will also be known automatically. Thus, the exact location of the object can be established on the basis of the sector and the distance data given by the radar. It is also possible to determine the surface element corresponding to the object by means of the thermal camera on the basis of the observation angle.

In an embodiment of the invention, when the location of an object, i.e. its direction and distance from the point of observation, is known, the size and shape of the object can be established by means of a thermal camera and this information can be processed by a suitable image processing technique to identify the object itself, i.e. e.g. whether the object is a human being, a group of people or a larger or a smaller animal. In this way, for instance small animals, such as hares and foxes, can be removed from the alarm list and an alarm is only issued upon detection of people and large animals, such as elks and bears.

As even the best thermal cameras only have a resolution that is sufficient for identifying an object at a distance of max. 500 m in favourable conditions, an embodiment of the invention uses the radar for object identification, in which case the system has been taught what the radar measurement response e.g. for a human being should be at different distances, i.e. what the radar cross-section of possible different objects is like. Thus, the detected object can be identified from the radar signal response on the basis of the distance data. The identification process can additionally be assisted by using the object velocity obtained by radar. Radar equipment can also be used for object identification at shorter distances in bad conditions, e.g. in rainy weather. In this case, the thermal camera is only used to distinguish warm living objects from other objects.

The radar used in the procedure of the invention generally works in the same way in all weather conditions, whereas the thermal camera is significantly affected by the weather. For this reason, the procedure of the invention preferably comprises the measurement of temperature both in shade and in a shadefree place in the area to be monitored and also the measurement of the amount of thermal radiation from the sun in a shadefree place e.g. by means of a solar cell, and the information thus obtained can be used to control the equipment. Similarly, atmospheric humidity can be measured to detect possible rainy conditions and to adjust the thermal camera. These measured data are preferably also utilized in making the decision as to whether the radar or the thermal camera is to be used for object identification.

In addition, the procedure of the invention may also include the measurement of wind direction and force to provide information that enables the system to recognize various movements detected by the radar that should not lead to an alarm. Such movements may include e.g. the sway of trees and plants in general and the movements of boats anchored at a quay.

The procedure of the invention has significant advantages as compared with prior art. The procedure of the invention does not require any sensor or alarm system built over the entire area to be monitored, but instead a single apparatus erected in a suitable place is sufficient. The procedure of the invention allows selective supervision of the entire area to be monitored, in other words, as the objects detected can be identified and their exact location is known, alarms can be issued only about desired objects in desired areas at desired times. Moreover, the procedure of the invention allows very large areas to be supervised with unity, because with modern technology and radar equipment and thermal cameras available, the procedure can be applied to monitor areas exceeding 1000 m in radius, which means that the entire surface area to be monitored may be over 3 km$^2$. In addition, the area to be monitored can be divided into sectors with an angle e.g. below one degree and the sectors can be further divided in the radial direction into surface elements at 30-m intervals, which means that the location of an object can be accurately determined even at the extreme limits of the area to be monitored.

BRIEF DESCRIPTION OF THE SEVERAL VIEWS OF THE DRAWING

In the following, the invention is described in detail by referring to the attached drawings, in which.

DETAILED DESCRIPTION OF THE INVENTION

Figure 1:
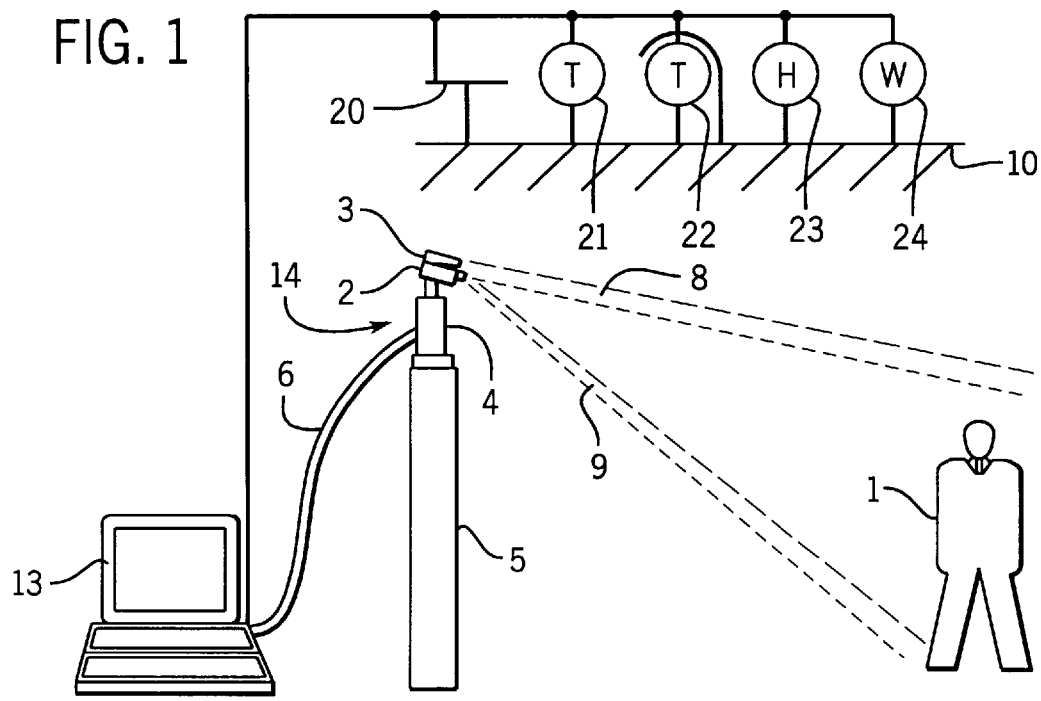
FIG. 1 is a diagram representing the equipment used in the procedure of the invention.

The equipment shown in FIG. 1 comprises a monitoring unit 14 placed on top of a column or other suitable structure or building of sufficient height. The monitoring unit comprises a thermal camera 2 and an electromagnetic radar 3. By means of a servo-system 4, these can turned horizontally and, if necessary, vertically as well. The radar and the thermal camera together with the servo-system are connected via a cable 6 to a processing device 13 for the control of the whole monitoring system and the processing of the data obtained. In the embodiment illustrated by FIG. 1, the thermal camera 2 and the radar 3 are so directed that the beam 9 of the thermal camera and the radar beam 8 are directed in the same direction, i.e. they scan the same area simultaneously.

Moreover, connected to the processing device 13 is a solar cell 20, a thermometer 21 in a shadefree place, a thermometer 22 in a shady place, a hygrometer 23 and a wind gauge 24, which make it possible to take the weather conditions prevailing in the area 10 to be monitored and their effects on the operation of the radar and thermal camera into account.

Figure 2:
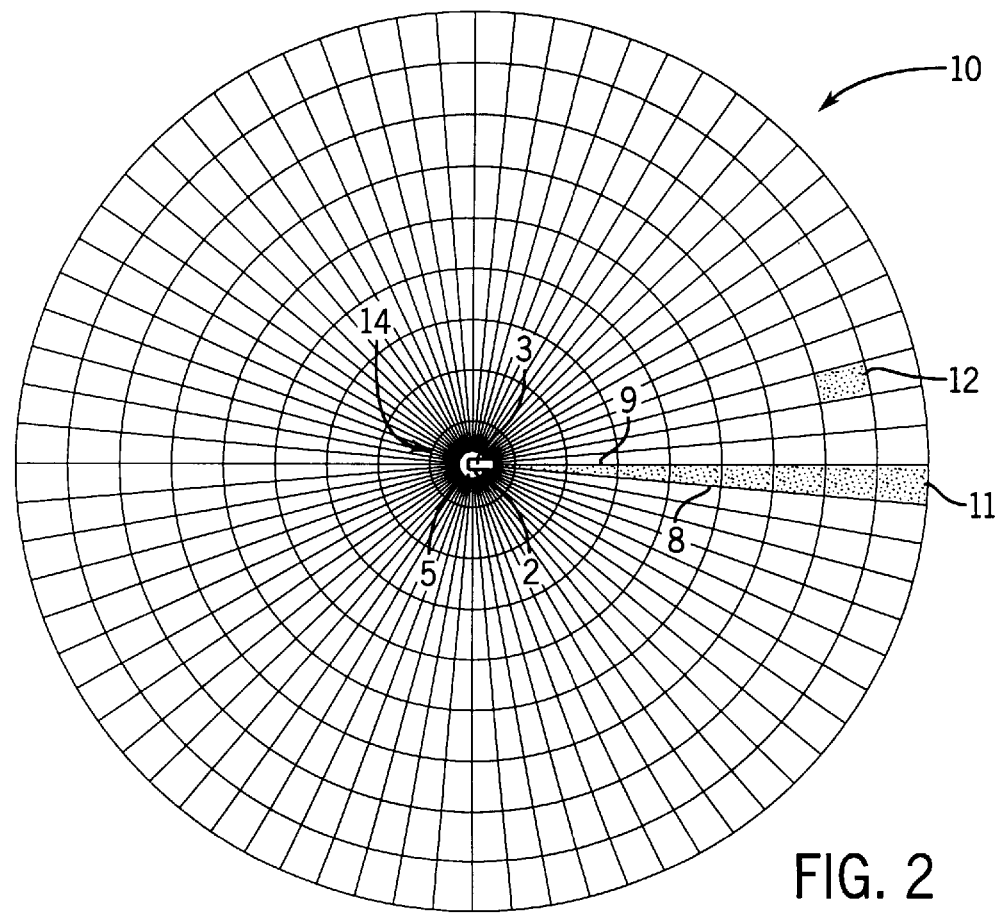
FIG. 2 illustrates the use of the equipment in FIG. 1 for the monitoring of a surface area.

The procedure of the invention is used in accordance with FIG. 2 e.g. as follows. The radius of a circular area to be monitored may be over 1000 m. At the centre of the area there is a monitoring unit 14, which comprises both a thermal camera 2 and an electromagnetic radar 3, mounted on a structure 5 of sufficient height. The entire area to be monitored has been divided into sectors 11, the sector width corresponding to the widths of the beams 9 and 8 of the thermal camera 2 and radar 3. The magnitude of the sector angle is preferably 0.5–1°.

The radar used may be any radar device based on electromagnetic radiation having a range sufficient for the area in question. As compared with ultrasonic or laser beam radar equipment, a radar based on electromagnetic radiation has the advantage of being considerably less sensitive e.g. to rain and fog. As to its operating principle, the radar may be either a doppler radar device, in which case it detects movements occurring within the beam, or it may be based on normal distance measurement, in which case the radar measures the distance to the objects within the beam, or a combination of these.

The area under the radar beam, i.e. the sector 11, is divided longitudinally into surface elements 12 of a suitable size, so the radar scans the area under the beam in the direction of distance. If the radar used only reacts to moving objects, it will not produce any disturbing ground return. Each echo returned from a surface element is subjected to an FFT transformation. In this way, only moving objects can be picked out and the velocity of these objects can be determined. As the surface element being observed is thus known, the distance, i.e. the location of the object can also be determined. In this way, an object moving in the area to be monitored can be detected and located.

After an object has been detected by the radar and its location or the corresponding surface element is known, the thermal camera can be used to examine the shape of the thermal image radiated by the object, if the conditions are good enough and the distance is not too long. As the exact distance of the object is known, the size of the object can also be determined from the image detected by the thermal camera. After the size and shape of the object have been perceived by the thermal camera, the object can be sufficiently identified by the image processing system of the processing unit 13 to provide information as to whether an alarm or other measures are necessary. Especially in frontier supervision, image processing and the ability to distinguish large warm animals such as elks, reindeer, bears and wolves from human beings renders the procedure extremely functional and usable.

If the distance of an object as measured using the best technology available at present is e.g. over 500 metres, and even at shorter distances in rainy or foggy weather, identifying an object by means of a thermal camera is impossible. Therefore, this system has been taught to recognize objects from the radar response as well. In other words, the system knows what sort of a radar response is produced by a human being or a corresponding object at different distances from the radar, so the radar can also be used for object identification.

Thus, the basic principle of the apparatus and procedure of the invention is to use both a radar device 3 and a thermal camera 2 to scan the area to be monitored. The radar is used to detect movements in the area to be monitored. The image provided by the thermal camera is continuously examined to detect spots that differ in temperature from the surrounding area. When either a movement or a temperature change is detected, this will cause closer examination of the situation. An eventual alarm is issued after the object has been examined more closely by radar or thermal camera, depending on the conditions and observation distance, and after the object has been located and identified as accurately as possible and if the supervision criteria for the area of observation require an alarm. It is also possible to perform several monitoring scanning cycles before activating an alarm. In this way, the presence of a suspicious object can be verified and the amount of false alarms reduced. The thermal camera can also be turned in a desired direction to follow an object or to verify a radar observation.

Another way to use the procedure of the invention in surveillance is by only registering all information obtained, without giving any alarms. Thus, for instance the supervision of an area to be closely monitored and the prevention of intrusions can be achieved by placing a monitoring unit as provided by the invention at the border of the area under surveillance, so that the apparatus will monitor the area in a semi-circular surveillance sector and give an alarm when necessary while the other semicircular sector monitors and registers actions occurring in the neighbourhood. This makes it possible to register abnormal actions even in the vicinity of the area under surveillance, thus significantly contributing towards preventing illicit activities in the area under surveillance.

We claim:

1. A method for monitoring large surface areas, said method comprising the steps of:

(a) rotating a thermal camera and an electromagnetic radar about a vertical axis to scan the area to be monitored;

(b) dividing the surface area to be monitored into surface elements, each of the surface elements being defined by an arcuate increment of the rotation of the camera and radar and by an increment of radial distance from the vertical axis;

(c) establishing monitoring criteria for each of surface elements so defined;

(d) using the radar to detect movement of objects in the surface area being monitored;

(e) detecting objects differing from their surroundings by means of the thermal camera;

(f) locating an object in a surface element of the surface area being monitored using the radar or thermal camera; and (g) identifying an object so located and meeting the monitoring criteria by using at least one of the electromagnetic radar and the thermal camera.

2. A method as defined in claim 1 wherein the thermal camera and electromagnetic radar are rotated to simultaneously scan the same area.

3. A method as defined in claim 1 wherein the thermal camera and electromagnetic radar are rotated so that, at a given time, they scan different areas.

4. A method as defined in claim 1 further defined as using the radar to scan in the radial direction from the axis with a selected surface element resolution and as including the steps of subjecting the return signal of the radar to a FFT transformation to distinguish moving objects from stationary objects and to determine their location and speed.

5. The method as defined in claim 1 further including the step of combining surface elements having the same monitoring criteria into a surface element group.

6. A method as defined in claim 1 wherein the thermal camera detects objects differing from their surroundings based on temperature differences between the object and the surroundings.

7. The method as defined in claim 1 wherein the object is located by the thermal camera by the angle of observation of the object.

8. A method as defined in claim 1 wherein the object is identified by the thermal camera on the basis of the distance to the object and the size and shape of the object as sensed by the thermal camera.

9. A method as defined in claim 1 wherein the object is identified by the electromagnetic radar on the basis of the radial distance and at least one of the radar return signal characteristics and the radar cross-section of the object.

10. A method as defined in claim 9 further defined as identifying the object using the velocity of the object.

11. A method as defined in claim 1 further defined as including the steps of measuring temperatures in portions of the surface area shaded from the sun, measuring temperatures in portions of the surface area exposed to the sun, and measuring the amount of thermal radiation from the sun in an exposed portion of the surface area.

12. A method as defined in claim 1 further including the step of measuring atmospheric humidity for use as a factor in identifying the object.

13. A method as defined in claim 11 further including the step of measuring atmospheric humidity for use as a factor in identifying the object.

14. A method as defined in claim 1 further including the step of measuring the direction and force of winds in the surface area for distinguishing movements caused by wind, as detected by the radar, from other movements in the surface area being monitored.

* * * * *